United States Patent Office 3,297,796
Patented Jan. 10, 1967

---

3,297,796
HYDROXYALKYL-AMINOMETHYL
PHOSPHONATES
John C. Smith, Houston, Brad H. Miles and Leonard Levine, Lake Jackson, and Wayne E. Presley, Freeport, Tex., assignors to The Dow Chemical Company, Midland, Mich., a corporation of Delaware
No Drawing. Filed Sept. 27, 1963, Ser. No. 312,010
12 Claims. (Cl. 260—928)

This invention relates to novel compositions of matter containing nitrogen and phosphorus atoms and to a process for the preparation of such compounds. More particularly, the present invention relates to poly(hydroxyalkyl-aminomethyl phosphonates), to the preparation of such compounds and to fire resistant foams prepared from such compounds.

The reaction of a dialkanolamine, an aldehyde (or ketone) and a dialkylphosphite to produce bis(hydroxyalkyl) phosphonic acid esters is disclosed in U.S. Patent 3,076,010 to Beck et al. Such compounds, however, contain only a single phosphorus atom in the molecule. The reaction of an N-alkyl-substituted methylol amine (obtained by reacting formaldehyde with a dialkylamine) and diethyl phosphite is disclosed by Fields in U.S. Patent 2,635,112. This reaction, however, does not produce aminomethyl phosphonates which contain hydroxyalkyl substituents within the molecule because the hydroxyl group of the alkylol amine reactant is split out during the reaction.

It has now been found that hydroxyalkylaminomethyl phosphonates may be prepared by the reaction of a phosphonic acid ester (phosphite) group

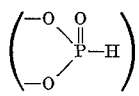

and an oxazolidine compound which contains a 2-hydroxyalkyl group attached to the heterocyclic nitrogen atom. The process does not produce water as a by-product. This reduces the production of hydrolysis products and foams with a very low acid number may be prepared from compounds manufactured according to this invention. In addition to providing a new class of hydroxyalkyl-aminomethyl phosphonates with at least two phosphorus atoms per molecule, the process also provdes a new method for the preparation of known hydroxyalkylaminomethyl phosphonates which contain only a single phosphorus atom per molecule. The compounds of the invention are named as derivatives of quinquevalent phosphonic acid

[HPO(OH)$_2$]

although this method has been criticized (Van Wazer, "Phosphorus and Its Compounds," vol. I, page 387, 1958).

The reaction upon which the invention is based is represented by the following equation:

wherein $n$ is an integer from 0 to 3, each $R_0$ may be the same or different and is selected from the group consisting of an alkylene group of from 2 to 8 carbon atoms (such as the lower alkylene groups of from 2 to 4 carbon atoms and the pentylene, hexylene, heptylene and octylene groups), the phenylene group (ortho-, meta- or para- —C$_6$H$_4$—) and a polyoxyalkylene group of from 4 to 8 carbon atoms and from 1 to 3 oxygen atoms, with no peroxy linkages (such as radicals derived from polyethylene glycol and polypropylene glycol by removal of the hydroxyl groups: —CH$_2$CH$_2$OCH$_2$CH$_2$—,

—C$_3$H$_6$OC$_3$H$_6$— and —CH$_2$CH$_2$OCH$_2$CH$_2$OCH$_2$CH$_2$OCH$_2$CH$_2$—), X represents a hydrogen atom, a hydroxyl group or a halogen (especially chlorine, bromine or fluorine), each R is independently selected from the group consisting of the hydrogen atom and a lower alkyl group of from 1 to 4 carbon atoms (as previously defined) and A represents an alkylene group of from 2 to 4 carbon atoms or the group —A—O— is a divalent polyoxyalkylene group of the formula $\{C_mH_{2m}O\}_k$ (such as divalent polyoxyethylene, polyoxypropylene and polyoxybutylene) in which $k$ is a positive integer from 1 to 6 (preferably from 1 to 4) and $m$ is a positive integer from 2 to 4 (preferably 2 or 3). Typical 3-oxazolidinealkanol starting materials include 5-methyl-3-oxazolidineisopropanol, 5-ethyl-3-oxazolidine-2-butanol, 5-n-propyl-3-oxazolidineethanol and 3-oxazolidineethanol.

When esters of polyphosphonic acids are employed in this reaction, compounds which contain from 2 to 4 phosphonic acid ester groups per molecule are produced ($n$ is 1 to 3). Suitable methods for preparing phosphonates which may be used as starting materials in the process of the invention are disclosed in copending U.S. application Serial Number 212,725, filed July 26, 1962, now Patent No. 3,188,341, the disclosure of which is herein incorporated by reference. The reaction of a polyol (such as ethylene glycol) and a phosphorus trihalide (such as PCl$_3$) produces a compound which contains a phosphonate ester group for each hydroxyl group in the starting polyol:

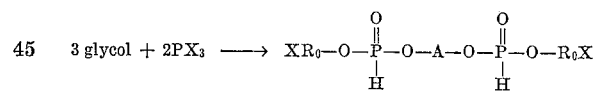

wherein X, R$_0$ and A are as defined in Equation I. When X is a hydroxyl group, a compound such as diethylene glycol (or suitable amounts of other polyols) and diethyl phosphonate [HPO(OCH$_2$CH$_3$)$_2$, often referred to as diethyl phosphite] may be reacted (either with or without a catalyst such as lithium hydride) to produce the compound:

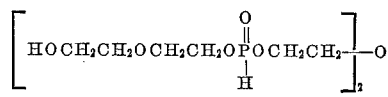

Similar products are obtained by reacting polypropylene glycol and H$_3$PO$_3$. When X is a hydrogen atom, other (I)
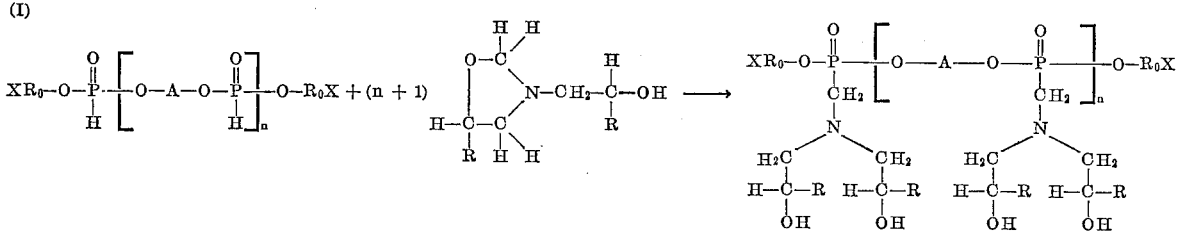

starting materials are obtained by the ester exchange reaction:

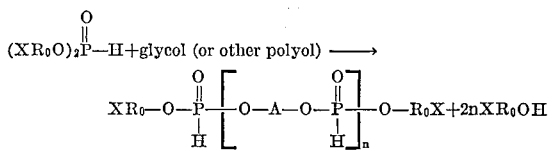

wherein $R_0$ is an alkylene group, X is H, $n$ is 0 to 3 and A is as previously defined in Equation I.

The following reactions further illustrate the process of the invention:

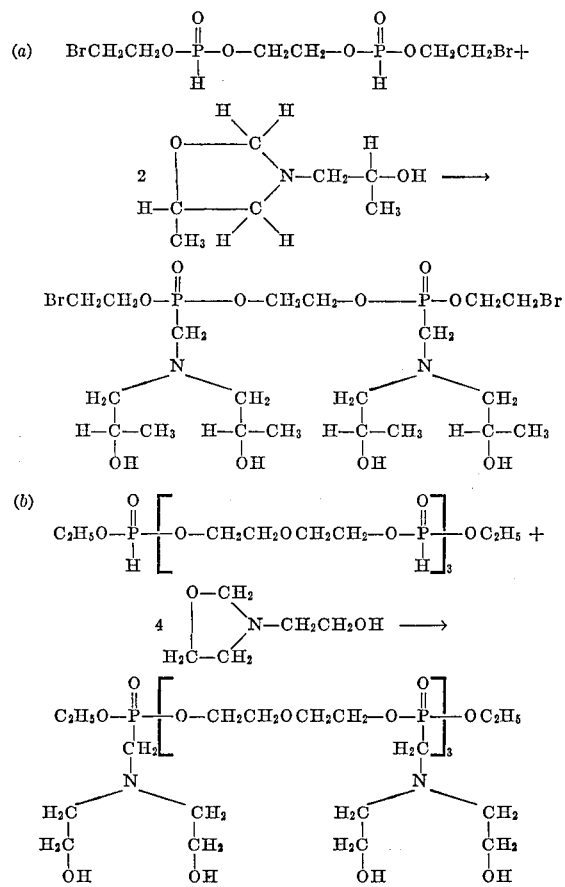

The reactions of the process may be carried out at temperatures of from 0° to 100° C., but are generally carried out at temperatures of from about 10° to about 70° C. (preferably from about 40° to 60° C.). The use of temperatures which are much above 70° C. leads to the formation of undesirable acid constituents from the by-products. Reactions carried out below 10° C. are slow. The reactions are not pressure sensitive and pressures of from a few hundredths of a millimeter of mercury up to several hundred atomspheres may be used. For convenience, the reactions are generally carried out at atmospheric pressure using temperatures of from 10° to 70° C.

The mole ratio of the reactants may vary from about 0.75 to 1.1 moles of 3-oxazolidinealkanol per mole of phosphonic acid ester group

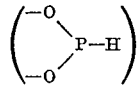

in the starting compound. It is preferable to use amounts of reactants which are as close to stoichiometric as possible (i.e, a 3-oxazolidinealkanol:phosphonic acid ester group mole ratio of 1:1). The use of excess 3-oxazolidinealkanol tends to give discolored products. When less than the stoichiometric amount of 3-oxazolidinealkanol is used, unconverted phosphonic acid ester groups are left in the final product.

The compounds manufactured according to the process of the invention are useful in a number of applications in the plastics industry. The compounds are especially useful when incorporated in plastic foams or other cellular plastic materials for imparting self-extinguishing and fire resistant properties to the plastic materials. An amount of hydroxyalkylaminomethylphosphonate sufficient to provide from 1 percent to 10 percent of phosphorus (based upon the total weight of the combined materials) in a polyurethane foam is sufficient to render the plastic foam fire resistant or to impart self-extinguishing properties to the plastic. The phosphorus-nitrogen containing compounds of this invention may be mixed with the plastic material prior to or during the curing or polymerization of the foam. When added to polyurethane foams, the phosphonate compounds of this invention are more stable, both to elevated temperatures and to hydrolysis, than are either the phosphates or phosphites.

The compounds of the invention may be incorporated into flexible or rigid foams, but are especially useful when incorporated into rigid polyurethane foams. Such foams are usually characterized by a structure with a high percentage of closed cells. In the formation of such foams, it is necessary that the polymer retain its strength before the gas within the cells has cooled—otherwise shrinking will occur because of the contraction of the cooling gas. A highly cross-linked structure is necessary in order to provide adequate strength and to give dimensionally stable rigid foams. The compounds of this invention are compatible with these properties. The percentage of open cells in a rigid foam is also related to other foam properties such as water absorption, moisture vapor transmission, gas permeability, thermal conductivity, heat distortion and density, Moreover, fine cells give a foam structure with a higher tensile strength than large cell foams. Foams containing a high percentage of closed cells may be readily prepared from premixes which contain the compounds of this invention.

In a typical procedure for preparing fire-resistant or self-extinguishing foams, an isocyanate prepolymer (prepared by reacting a polyol, such as, for instance, an oxyalkylated sucrose—or poly(oxypropylene) glycols and triols—with a tolylene diisocyanate) having an isocyanate content of from about 20 to 35 percent is added to a "cross-linking agent" (a mixture containing a foaming agent, such as water, trichlorofluoromethane, or other conventional foaming agent, plus additional polyol). Either the cross-linking agent or the prepolymer (or both) may contain amounts of hydroxyalkyl-aminomethylphosphonates sufficient to give a final foamed product which contains from about 0.25 percent to 5 percent (preferably 1 percent to 4 percent) by weight of phosphorus based upon the total weight of the foam. Commercially available isocyanates and polyethers which may be employed to prepare the cross-linking agents and prepolymers of this invention are described on pages 347–350 in vol. XVI, Part I, of "High Polymers" by Saunders and Frisch (1962).

The following examples are submitted for the purpose of illustration only and are not to be construed as limiting the scope of the invention in any way.

EXAMPLE I

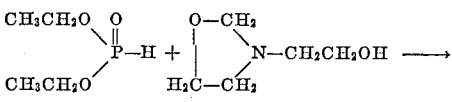

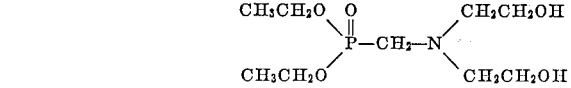

Into a reaction vessel equipped with a means for stirring, reactant addition and temperature control was placed 41.4 parts by weight of diethyl phosphonate. To this was added dropwise 35.2 parts by weight of 3-oxazolidine-ethanol over a two hour period while maintaining the reaction temperature at about 60° C. The diethyl ester of bis(2 - hydroxyethyl)aminomethylphosphonic acid which was produced was a light yellow liquid. The yield was 100 percent of theory.

*Analysis (percent by weight)*

|   | Actual | Theoretical |
|---|---|---|
| P | 11.9 | 12.1 |
| OH | 13.5 | 13.6 |
| N | 5.43 | 5.48 |

EXAMPLE II

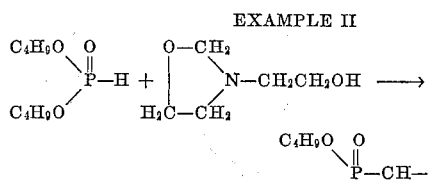

Into a reaction vessel equipped as in Example I was placed 194 parts by weight of di-n-butyl phosphonate. To this was added dropwise 117.1 parts by weight of 3-oxazolidineethanol over a period of about 2 hours while maintaining the temperature at about 65° C. The yield of the dibutyl ester of bis(2-hydroxyethyl)aminomethylphosphonic acid was 100 percent of the theoretical yield.

*Analysis (percent by weight)*

|   | Actual | Theoretical |
|---|---|---|
| P | 9.61 | 10.3 |
| OH | 11.2 | 11.3 |
| N | 4.7 | 4.65 |

EXAMPLE III

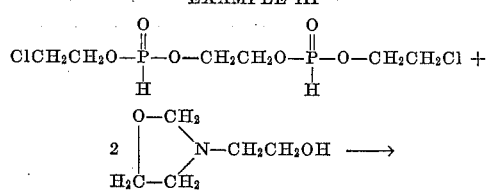

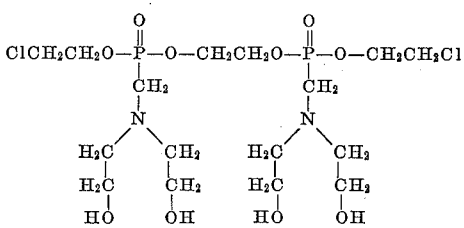

Into a reaction vessel equipped as in the preceding examples was placed 582.4 parts by weight of 88 percent by weight pure ethylene bis(2-chloroethyl phosphonate). To this was added dropwise 389 parts by weight of 3-oxazolidineethanol over a two hour period while maintaining the temperature at about 60° C. The yield of product, the ethylene glycol diester of the 2-chloroethyl ester of bis(2 - hydroxyethyl)-aminomethylphosphonic acid, was 100 percent of the theoretical yield.

*Analysis (percent by weight)*

|   | Actual | Theoretical |
|---|---|---|
| P | 11.9 | 11.4 |
| OH | 10.2 | 12.5 |
| Cl | 12.5 | 13.0 |

EXAMPLE IV

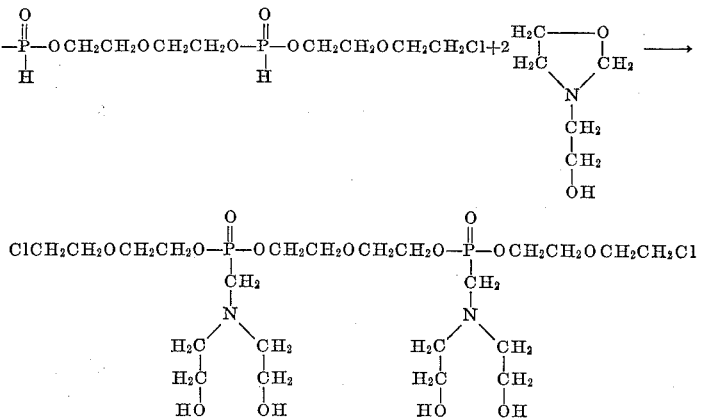

Into a 500 milliliter three-necked flask equipped with a stirrer, dropping funnel, thermometer, dry nitrogen inlet tube and outlet tube was placed 162 parts of

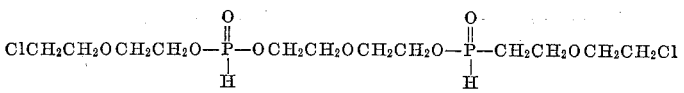

(prepared by reacting diethylene glycol and PCl₃; 86 percent by weight pure). To this polyphosphonate was added dropwise 84 parts of 3-oxazolidinethanol. The temperature rose initially to 45° C. and was controlled by means of an ice bath at 30°–60° C. throughout the remainder of the addition. The mixture was allowed to sit overnight. The final compound was a light brown viscous material (molecular weight 683) with the following analysis:

*Analysis (percent by weight)*

|   | Actual | Theoretical |
|---|---|---|
| P | 9.86 | 9.1 |
| OH | 10.2 | 9.9 |
| N | 4.56 | 4.1 |

EXAMPLE V

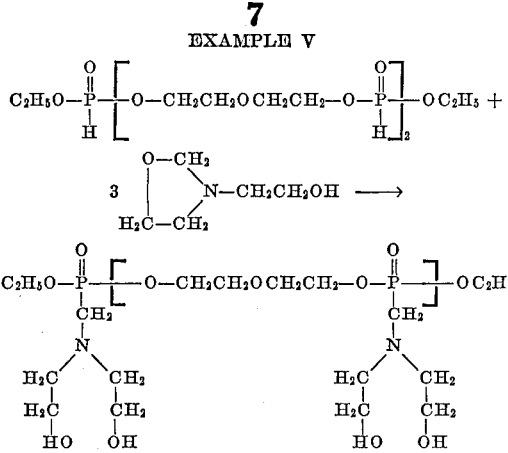

Into a 500 milliliter flask equipped as in Example IV was placed 184.6 parts of

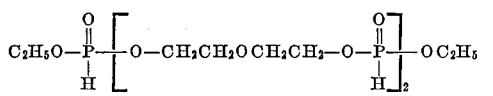

prepared by reacting diethyl phosphonate and diethylene glycol. To this was added 146.3 parts of 3-oxazolidine-ethanol through a dropping funnel over a 30 minute period. The temperature increased from room temperature to 60°–70° C. where it was held until the addition of 3-oxazolidineethanol was complete. The reaction mixture was then allowed to cool to room temperature and was allowed to sit overnight. The diethylene glycol diester of the ethyl ester of bis(2-hydroxyethyl)-aminomethylphosphonic acid gave the following analysis:

*Analysis (percent by weight)*

|    | Actual | Theoretical |
|----|--------|-------------|
| P  | 11.9   | 11.75       |
| OH | 12.9   | 12.84       |
| N  | 5.54   | 5.3         |

EXAMPLE VI

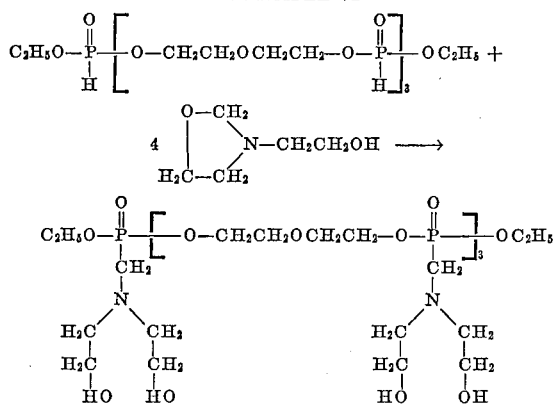

Into a 500 milliliter flask equipped as in Example V was placed 156.8 parts of 94 percent pure

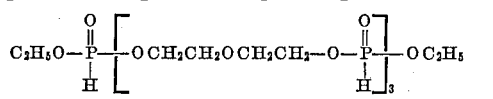

prepared by reacting diethyl phosphonate with the appropriate number of moles of diethylene glycol. To this was rapidly added 117 parts of 3-oxazolidineethanol through a dropping funnel. Temperature during the addition was 60°–70° C. After the addition of the 3-oxazolidineethanol, the reaction mixture was allowed to cool to room temperature. The tetra[bis(2-hydroxyethyl)-aminomethylphosphonic acid] ester produced was analyzed.

*Analysis (percent by weight)*

|    | Actual | Theoretical |
|----|--------|-------------|
| P  | 12.1   | 11.7        |
| OH | 12.6   | 12.8        |
| N  | 5.33   | 5.26        |

EXAMPLE VII

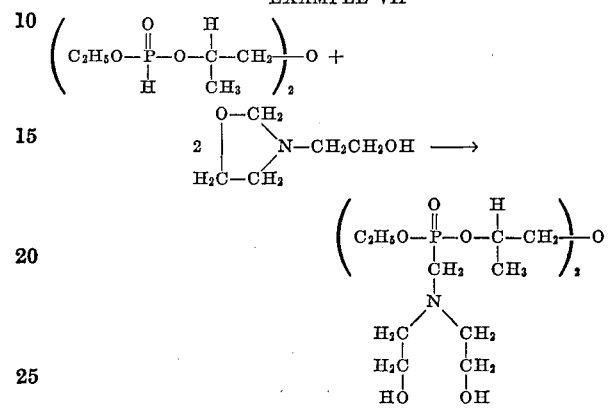

To a flask equipped as in the preceding example was placed 135 parts of the diphosphonate starting material $C_{10}H_{24}O_7P_2$ (prepared by reacting diethyl phosphonate and dipropylene glycol). To this was added dropwise 93.6 parts of 3-oxazolidineethanol with stirring over a 20 minute period. During the addition, the temperature rose to 65° C. and was maintained at 55°–65° C. during the remainder of the addition. The bis(2-hydroxyethyl)-aminomethylphosphonic acid ester product was analyzed for phosphorus and hydroxyl content.

*Analysis (percent by weight)*

|    | Actual | Theoretical |
|----|--------|-------------|
| P  | 10.9   | 10.8        |
| OH | 11.9   | 11.9        |

EXAMPLE VIII

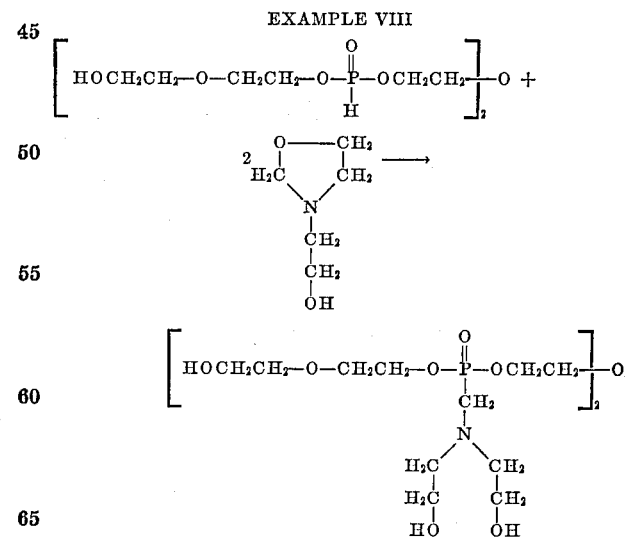

Into a three-neck flask equipped with a stirrer, thermometer, reflux condenser, and dropping funnel was placed 179.1 parts of

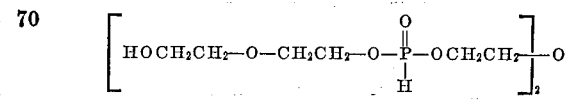

(prepared by the reaction of diethylene glycol and diethyl phosphonate in the presence of a lithium hydride catalyst). To this was added dropwise 75.5 parts of 3-oxazolidineethanol at room temperature. The exothermic reaction raised the temperature of the reaction mixture to 45°–60° C. and the mixture was held within this temperature range until the reaction was complete. The final product was a light yellow, clear liquid.

*Analysis (percent by weight)*

|   | Actual | Theoretical |
|---|---|---|
| P | 10.6 | 9.6 |
| OH | 14.3 | 15.9 |
| N | 3.92 | 4.35 |

EXAMPLE IX

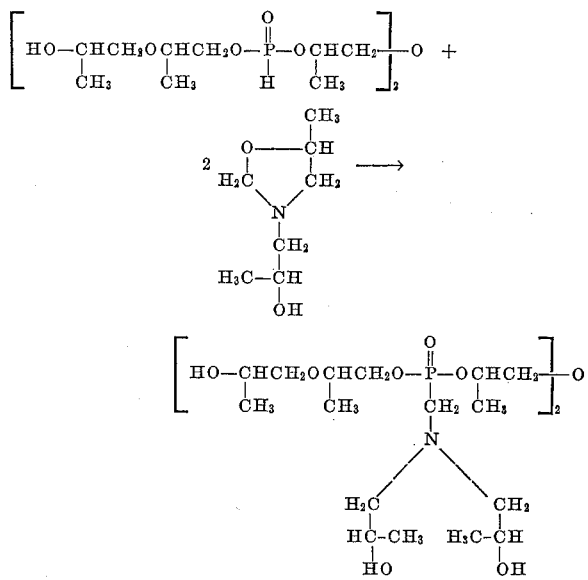

In a flask equipped as in Example VIII was placed 260 parts of

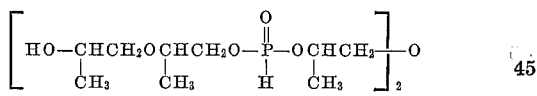

(prepared by reacting diethyl phosphonate and dipropylene glycol in the presence of sodium methoxide). To this was added dropwise 145 parts of 1-(5-methyl-3-oxazolidinyl)-2-propanol. The temperature rose to 70° C. After the addition was complete, the reaction mixture was heated for six hours at 60°–65° C. to insure complete reaction. The product was a viscous, yellowish-brown liquid.

*Analysis (percent by weight)*

|   | Actual | Theoretical |
|---|---|---|
| P | 8.28 | 8.26 |
| OH | 12.9 | 13.5 |
| N | 3.93 | 3.70 |

EXAMPLE X

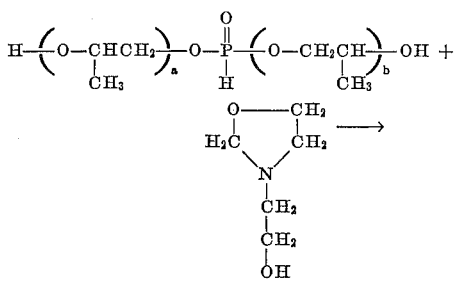

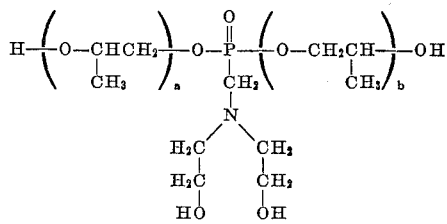

($a$ and $b$ are integers which may have any value from 1 to 4).

To a flask equipped as in the preceding example was added 60 parts of the phosphonate starting material (prepared by reacting propylene oxide with anhydrous $H_3PO_3$ in a mole ratio of 4 moles of propylene oxide per mole of $H_3PO_3$). To this was added 17.8 parts of 3-oxazolidineethanol. The resulting mixture was cooled to keep the temperature below 70° C. until the exothermic reaction was complete. The resulting compound $$(C_{17}H_{38}NO_9P)$$

was a pale yellow, thin liquid. Analysis for OH gave a value of 14.8 percent by weight (theoretical=15.8 percent).

We claim as our invention:

1. A compound of the formula

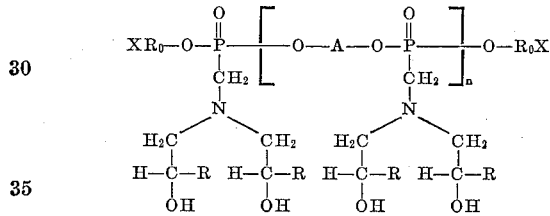

wherein:

(a) $n$ represents an integer from 1 to 3,
(b) each X is a member independently selected from the group consisting of the hydrogen atom, a hydroxyl group and a halogen,
(c) each $R_0$ is a member independently selected from the group consisting of an alkylene group of from 2 to 8 carbon atoms, a phenylene group and a polyoxyalkylene group of from 4 to 8 carbon atoms and from 1 to 3 oxygen atoms,
(d) each R is independently selected from the group consisting of the hydrogen atom and a lower alkyl group, and
(e) A is a divalent group of the formula $$(C_mH_{2m}O)_{k-1}C_mH_{2m}-$$

wherein $k$ is a positive integer of from 1 to 6 and $m$ is a positive integer of from 2 to 4.

2. A compound of the formula

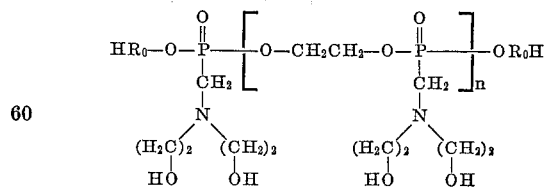

wherein $R_0$ is an alkylene group of from 2 to 8 carbon atoms and $n$ is an integer from 1 to 3.

3. The compound:

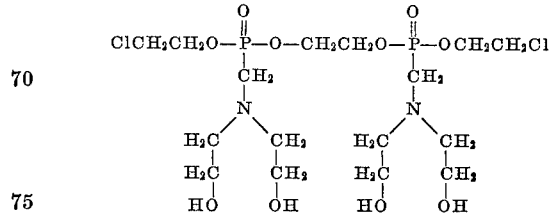

4. The compound:

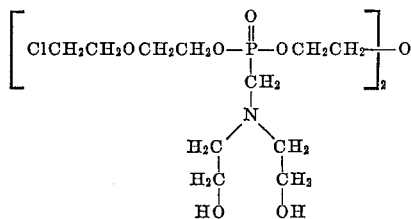

5. The compound:

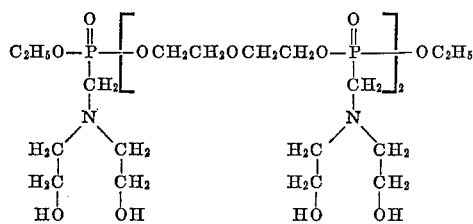

6. The compound:

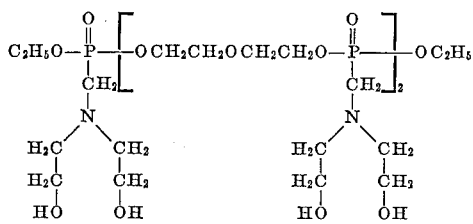

7. The compound:

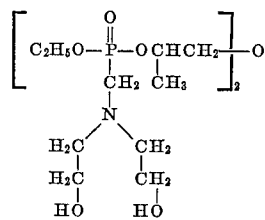

8. The compound:

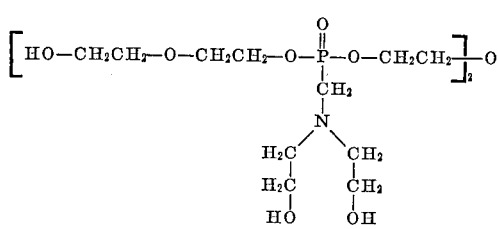

9. The compound:

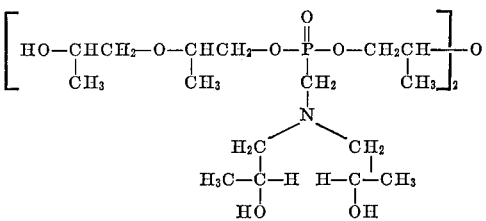

10. A compound of the formula

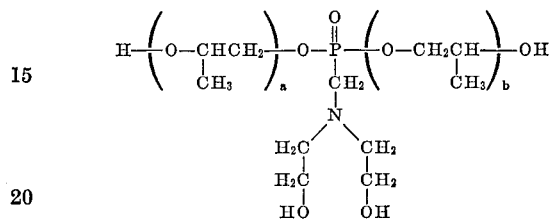

wherein $a$ and $b$ are integers from 1 to 4.

11. A process for the preparation of nitrogen-containing esters of phosphonic acids which comprises reacting
(I) a compound of the formula

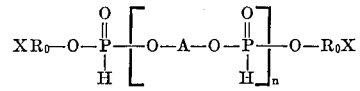

wherein:
(a) $n$ represents an integer from 0 to 3,
(b) each X is a member independently selected from the group consisting of the hydrogen atom, a hydroxyl group and a halogen,
(c) each $R_0$ is a member independently selected from the group consisting of an alkylene group of from 2 to 8 carbon atoms, a phenylene group, and a polyoxyalkylene group of from 4 to 8 carbon atoms and from 1 to 3 oxygen atoms, and
(d) A is a group of the formula $-(C_mH_{2m}O)_{k-1}C_mH_{2m}-$ wherein $k$ is a positive integer of from 1 to 6 and $m$ is a positive integer of from 2 to 4, and
(II) a compound of the formula

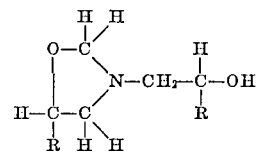

wherein R is selected from the group consisting of the hydrogen atom and a lower alkyl group.

12. The process in accordance with claim 11 wherein the reaction is carried out at temperatures of from 0° to 100° C.

No references cited.

CHARLES B. PARKER, *Primary Examiner.*

F. M. SIKORA, *Assistant Examiner.*